United States Patent [19]

Derderian et al.

[11] 4,151,411

[45] Apr. 24, 1979

[54] LASER SAFETY GOGGLES

[75] Inventors: George Derderian, Maitland; Windell N. Mohon, Winter Park, both of Fla.

[73] Assignee: The United States of America as represented by the Secretary of the Navy, Washington, D.C.

[21] Appl. No.: 876,373

[22] Filed: Feb. 9, 1978

[51] Int. Cl.² ............................................. G01J 1/20
[52] U.S. Cl. ................................. 250/225; 250/201; 350/159
[58] Field of Search ................. 250/225, 201; 350/159

[56] References Cited

U.S. PATENT DOCUMENTS

| 3,423,321 | 7/1967 | Hurley | 252/135 |
| 3,669,526 | 6/1972 | Weiss | 350/159 |

Primary Examiner—David C. Nelms
Assistant Examiner—Hostetter, Darwin R.
Attorney, Agent, or Firm—Richard S. Sciascia; Don D. Doty

[57] ABSTRACT

An automatic adjustable radiant energy filter system adapted for protecting human eyes (and other optical devices) from dangerous intensities of laser light or other types of radiation during experimentation therewith is disclosed as including a pair of relatively moving polarized filters, one of which is automatically positioned with respect to the other as a consequence of a unique photodetector and negative feedback system combination sensing and controlling the aforesaid laser light radiation that passes therethrough in accordance with a predetermined intensity level. Fixed filters may be selectively mounted in front of said polarized filters, in order to control the amount and frequency of ambient radiant energy supplied thereto; and a shutter and unique control subsystem therefor are combined with the aforesaid photodetector in such manner as to completely stop said laser light radiation from being supplied thereto whenever the intensity thereof exceeds a given dangerous level, thereby completely protecting the aforesaid human eyes therefrom, too.

31 Claims, 5 Drawing Figures

LASER SAFETY GOGGLES

FIELD OF THE INVENTION

In general, the present invention relates to optical filters and, in particular, is an automatic adjustable radiant energy filter system for controlling the amount of radiant energy to which an optical sensor may be exposed during any given operational circumstances. In even greater particularity, the subject invention constitutes new and unique safety goggles that may be used to a considerable advantage to protect the eyes and eyesight of an individual from high power laser light while he is working therewith but, at the same time, permit said individual to see at least a portion of said laser light, thereby facilitating his directly working therewith for many different purposes. Moreover, in addition to providing physiological protection to human eyes, the instant invention pertains to an unusual optical system which may be attached to any optical instrument for automatically passing only a predetermined amount of light or other radiant energy to the optical input thereof.

DESCRIPTION OF THE PRIOR ART

Heretofore, numerous filter systems, lenses, polarizers, etc., have been employed to provide protection to the human eyes and other optical devices. For example, sun glasses, so-called dark glasses, polarized glasses, and the like, are well known as eye protectors and visual aids for people exposed to bright sunlight. Furthermore, high optical density goggles and face shields are ordinarily worn by welders and others exposed to bright electric arcs and other high intensity lights. And, of course, it is well known for scientists, engineers, technicians, and others who are working with lasers to wear safety goggles for protection from laser light, inasmuch as such goggles are designed to block all of a certain wavelength of the light which emanates therefrom. Ordinarily, such eye protection is effected to covering the eyes with constant high optical density filters or lenses which are held in place by frames, masks, or the like, that are worn on the human head. Unfortunately, old style goggles are usually cast aside because they work at only one wavelength and/or are usable only in very limited energy level ranges.

Obviously, it is, likewise, conventional to place optical filters in front of the lenses of telescopes, binoculars, and cameras. With respect to the latter, however, the amount of restriction of the ambient, subject, or other light supplied thereto may also be controlled by exposure stop size, shutter speed, and diameter and light gathering power of the objective lens incorporated therein.

Because the aforesaid optical devices are more or less common ones which are self-contained unitary devices per se (or perhaps accessories that may or may not be attached thereto) which are in everyday use and, thus, are copious in quantity, they are deemed to constitute prior art representations that are quite comprehensive in scope; however, there are undoubtedly others of similar natures that should be discussed which are ostensibly more sophisticated in construction, as far as the filter systems thereof are concerned. For instance, the Automatic Electric Self-synchronizing Polarizing Windows of U.S. Pat. No. 3,669,526 to Weiss discloses a pair of relatively rotatable polarizing windows that control the amount of light passing therethrough either by manual means or in response to a light sensitive detector and a complex negative feedback system. Furthermore, the Photoelectrically Controlled Light Polarizing Element of U.S. Pat. No. 3,423,321 to Hurley, Jr., also discloses a pair of relatively rotatable polarizers, one of which is driven with respect to the other by a reversible motor that is controlled by a phototube and another negative feedback system.

SUMMARY OF THE INVENTION

All of the aforementioned prior art devices are ostensively quite satisfactory for some purposes; nevertheless, for many practical purposes, they appear to leave something to be desired. Except for those of said U.S. patents, automatic light control is not effected thereby; and with respect to those aforementioned patented devices, it is opined that they are less positive acting, less rapid acting, and certainly less operational in scope than the subject invention. Hence, they appear to be somewhat relatively deficient, as far as efficiency is concerned. Of course, they are also different from each other and the instant invention as far as structure is concerned, inasmuch as they and the instant invention appear to comprise different combinations of elements, respectively.

Briefly, the invention is an automatic radiant energy filtering and stopping system which may be used to protect the eyes of people involved in laser or other dangerous radiant energy experiments or operations. It is also an automatic filter system that may be employed in conjunction with practically all known optical instruments, sensors, and other devices wherein the radiant energy input thereto needs to be automatically controlled or, in the event of unsafe conditions, stopped completely.

Very simply, the subject invention consists of a pair of relatively rotatable polarized filters, one of which is automatically positioned with respect to the other as a result of sensing the laser light being received thereby, so as to block portions thereof and, thus, prevent excess and perhaps dangerous amounts thereof from being received by human eyes or other delicate optical devices. A simple but unique negative feedback system is combined with a suitable photodetector means for sensing said laser light and one of the aforesaid filters, in order to effect the adjustment thereof with respect to the other of said filters in such manner as to safely control the amount of laser light passing therethrough. In unique structural combination with said filters is a unique laser light shutter subsystem which functions in combination with the aforesaid photodetector to practically instantaneously stop the passing of any laser light therethrough, in the event the transmission of said laser light therethrough reaches a level of intensity that would be dangerous to human eyes (or any other sensitive devices that may be involved). Of course, means is provided within both of the aforementioned systems for the respective setting of the permissible radiant energy that may pass through each thereof, and, moreover, additional fixed filters or lenses may be selectively contiguously disposed with said filters and/or shutters, if so desired.

Accordingly, the subject invention is deemed to overcome many of the disadvantages of the above mentioned and other prior art devices, in that it functions in a more effective manner, especially as far as protecting people who are working with or in proximity with dangerous laser light or other radiant energy. For comparison purposes, and to show a very important benefit provided by the subject invention, it would perhaps be worthy of note that the subject automatic filter system is so fast acting and so effective that it will protect the eyes of a human being who inadvertently turns his head in such manner — perhaps sideways — that laser light would otherwise be adversely received by his eyes and harm them before his sense of sight and muscular reflexes could cause him to safely turn away. Hence, the safety of working with lasers and other dangerous optical energy is vastly improved, ostensively an advantage over the automatic and fixed filters of the prior art, indeed.

Of course, as will be explained more fully subsequently, numerous other advantages — such as, for example, simplicity of construction, lightness of weight, economy of manufacture, maintenance, and use, reliability of performance, and convenience of using or wearing on a helmet or other headpiece — are provided by the filter system constituting the invention.

An important object, therefore, is to provide an improved optical filter system.

Another object of this invention is to provide an improved method and means for protecting the eyes of human beings that are inadvertently exposed to otherwise very dangerous laser light or other radiant energy.

Still another object of this invention is to provide an improved automatic filter system which will permit a human being to look at a laser light and see it relative to its ambient environment without hurting his eyes, thereby facilitating his working with lasers under numerous experimental conditions.

Another object of this invention is to provide an improved method and means for regulating the amount of any predetermined radiant energy — laser or otherwise — that is received by human eyes, optical inputs of optical instruments and devices, and other objects.

Another object of this invention is to provide improved safety goggles.

Still another object of this invention is to provide an improved predetermined light transmitting window.

Another object of this invention is to provide a more efficient, positive acting, automatic method and means for controlling the relative dispositions of predetermined light polarizers.

Another object of this invention is to provide an improved optical and light control system that may be used to an advantage to automatically regulate the amount of light and/or other radiant energy to which such instruments as cameras, microscopes, binoculars, telescopes, and other devices may be subjected during the operation thereof.

Another object of this invention is to provide an improved automatic adjustable radiant energy filter system that is easily and economically manufactured, maintained, transported, stored, and operated.

Other objects, advantages and novel features of the invention will become apparent from the following detailed description of the invention when considered in conjunction with the accompanying drawing wherein:

DESCRIPTION OF THE PREFERRED EMBODIMENT

Figure 1:
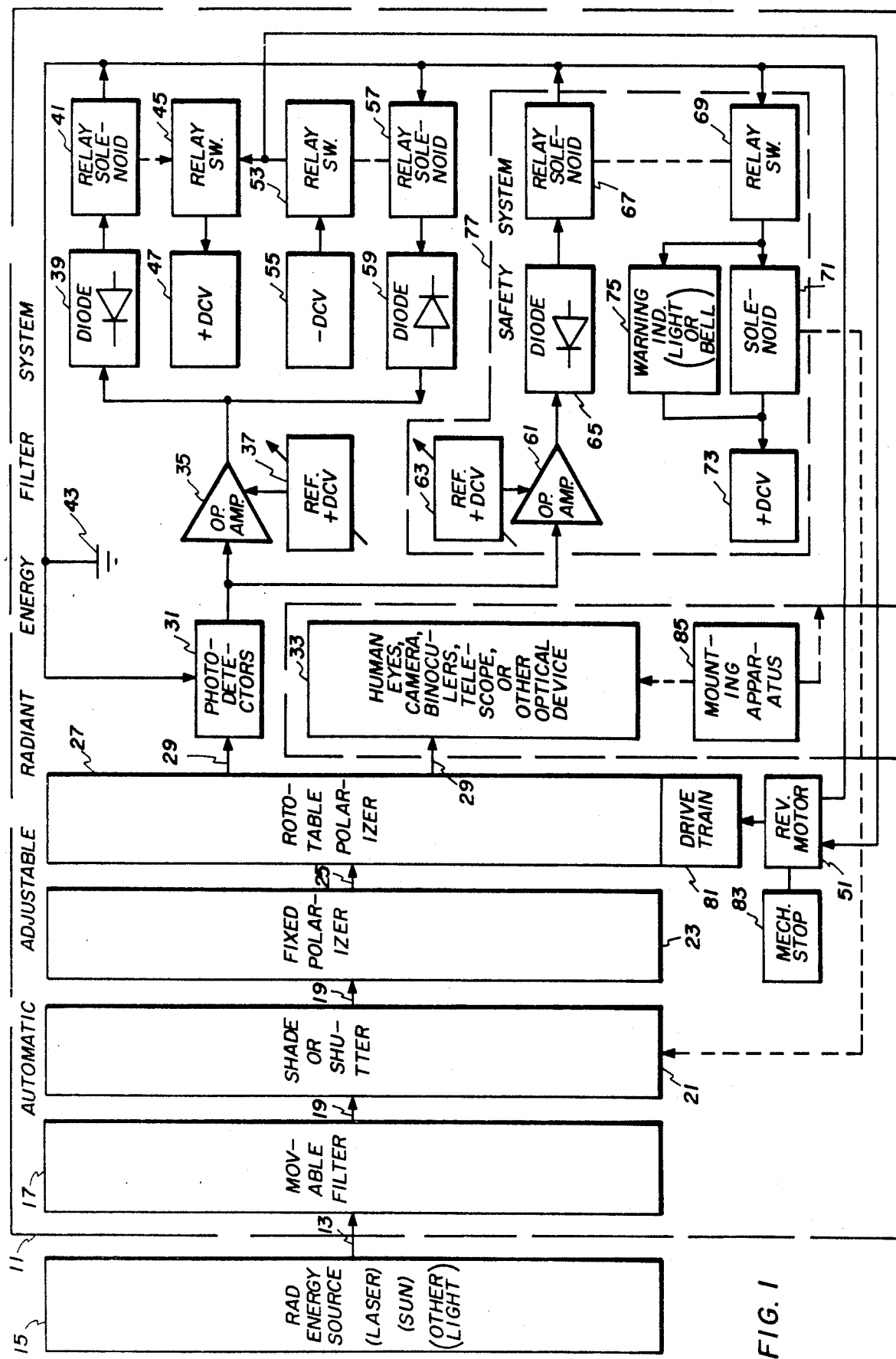
FIG. 1 is a block diagram of the automatic adjustable radiant energy filter system constituting this invention.

The subject invention will now be discussed in some detail in conjunction with all of the figures of the drawing, wherein, insofar as is practical, like parts will be defined by like reference numerals. Hence, referring now to FIGS. 1, 2, and 3, both collectively and respectively, the automatic adjustable radiant energy filter system 11 constituting the invention is shown as receiving and being responsive to a predetermined radiant energy 13 from a radiant energy source 15, wherein the latter may be a laser, the sun, or any other light source, be it remote, close by, direct, indirect, beam producing, ambient, or otherwise. Thus, without limitation, it should be understood that the aforesaid radiant energy 13 may be any wavelength of laser or other coherent light, sunlight, artificial phosphorescent or incandescent light, or any naturally produced light. Obviously, it would be well within the purview of the artisan having the benefit of the teachings presented herewith the design to subject invention to be responsive to any preferred type or types of radiant energy.

For the sake of simplicity of disclosure and inasmuch as all of the devices thereof are substantially alike, all of the figures of the drawing will be discussed simultaneously.

The aforementioned radiant energy 13 is received at the optical input of the invention which, in this particular instance, is a filter 17 which may be designed by the artisan to pass, block, or partially reject any predetermined wavelength of radiant energy. Obviously, the particular use for which the subject invention is intended at any given time should be taken into consideration when designing filter 17. After being filtered by filter 17, radiant energy 13 becomes a particularized radiant energy 19 which is received by a shade or shutter 21 which, as a general rule, is opaque in nature when operated to be so. In this particular case, any conventional, commercially available shade or shutter 21 may be used which is suitable for its intended purpose; nevertheless, because said shade or shutter 21 must be exceedingly rapid acting — that is, one which will shut off within approximately 25 nanoseconds — it has been determined that the electro-optical shutter Model 317, manufactured by Coherent Associates of Danbury, Conn., may be used. Accordingly, when shade 21 does not happen to be operative, radiant energy 19 continues on its path and is received by a fixed polarizer 23 through which it passes as radiant energy 25 before being received by a rotatable polarizer 27. As may readily be seen, fixed polarizer 23 and rotatable polarizer 27 are relatively movable with respect to each other, and to permit such operation, they are spatially disposed from each other a predetermined preferred design distance.

Figure 2:
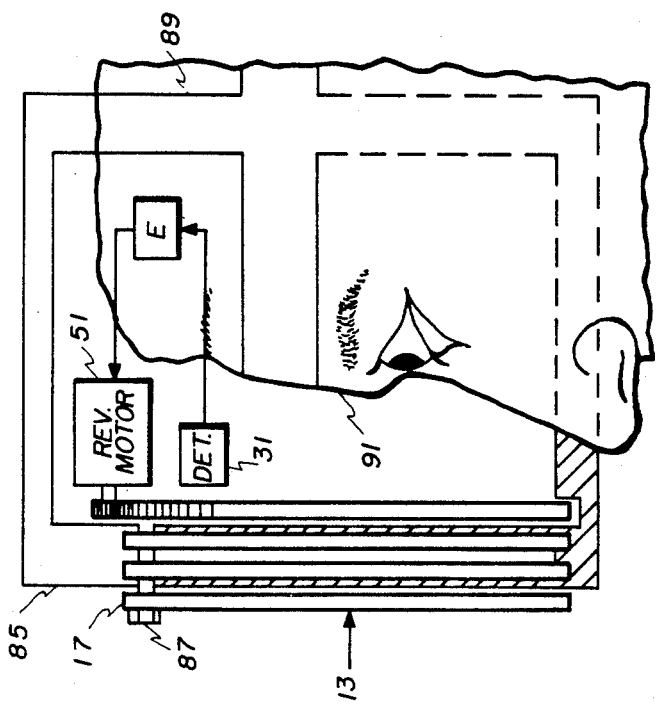
FIG. 2 is a schematic — pictorial representation of a portion of the filter system depicted in FIG. 1 in combination with a person wearing it.
Figure 4:
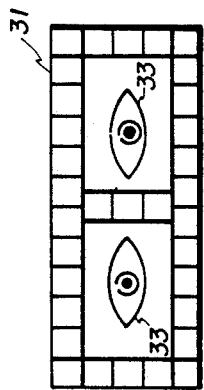
FIG. 4 is a front elevational view of a representative geometrical configuration which may be used for the photodetector array of FIG. 1.
Figure 5:
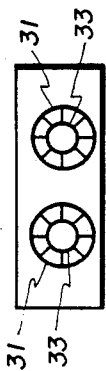
FIG. 5 is a front elevational view of another representative geometrical configuration of the photodetectors which may be used to surround those things which are to be protected from excessive and dangerous laser light and other radiant energy.

The output of rotatable polarizer 27 is that radiant energy 29 which has been permitted to pass through fixed polarizer 23 and rotatable polarizer 27 as determined by the relative rotational dispositions thereof, and said resulting radiant energy 29 is that energy which impacts upon the optical input of one or more photodetectors 31. As will be discussed in greater detail subsequently, photodetectors 31 may be physically disposed in the form of an array that is contiguous with, or perhaps surrounds, any particular object or objects to be protected, such as, for example, human eyes, cameras and the film thereof, binoculars, telescopes, or other optical devices 33. And, of course, as is well known in the art, photodetectors 31 may be of any conventional type which is responsive to the radiant energy involved and which would produce an electrical signal at the output thereof which is substantially proportional to the radiant energy supplied thereto. For such purpose, if so desired, a photodiode or a photocell may be used as each or any of photodetectors 31, be it an individual detector, as shown in FIG. 2, or an array of detectors, as depicted in FIGS. 1, 4, and 5.

Obviously, because the human eyes, cameras, binoculars, telescopes, or other optical devices to be protected are to be protected from the same radiant energy as is received by photodetectors 31, it is herewith referenced by reference numeral 29, as was the radiant energy received by said photodetectors 31. Hence, it may readily be seen that the resultant control parameter in this particular instance is that radiation which is received by photodetectors 31 and objects 33, regardless of what it may have been when received as radiant energy 13 mentioned previously.

The output of photodetectors 31 is connected to the input of an operational amplifier 35 which may be any conventional operational amplifier that is suitable for its intended purpose in this invention; however, a Model 425 Operational Amplifier manufactured by OPAMP Laboratories, Inc., of Los Angeles, Calif., may be used is so desired.

A positive direct current reference voltage 37 is supplied to the control input of operational amplifier 35.

The output of operational amplifier 35 is connected to the cathode of a diode 39, the anode of which is connected to the input of a relay solenoid 41, with the output thereof connected to a ground 43, which is likewise connected to one of the inputs of the aforesaid photodetectors 31. The mechanical actuation output of solenoid 41 is connected to a normally open relay switch 45 for the timely opening and closing thereof. The electrical input of said relay switch 45 is connected to the output of a positive direct current voltage 47, and the electrical output thereof is connected to one of the inputs of a reversible direct current motor 51. The electrical input of said relay switch 53 is connected to the output of a negative direct current voltage 55. The mechanical actuation input thereof is connected to the mechanical output of relay solenoid 57, so that it may be timely opened and closed thereby. The electrical input of said relay solenoid 57 is connected to the aforesaid ground 43, and the electrical output thereof is connected to the cathode of a diode 59 which, in turn, has its anode connected to the output of the aforesaid operational amplifier 35 and the cathode input of the aforesaid diode 39.

The aforesaid ground 43 is also connected to the other input of said reversible direct current motor 51.

The output of photodetectors 31 is also connected to the input of another operational amplifier 61, which may be similar to the aforementioned operational amplifier 35 or may be any other conventional, commercially available operational amplifier, as desired. The control input of operational amplifier 61 is connected to the output of an adjustable positive direct current reference voltage 63, and the output thereof is connected to the cathode of a diode 65, with the anode output thereof connected to the electrical input of a relay solenoid 67, the electrical output of which is connected to the aforesaid ground 43. The mechanical actuation output of relay solenoid 67 is connected to the mechanical actuation input of a normally open relay switch 69 for the timely closing and opening thereof. The electrical input to said relay switch 69 is connected to the aforesaid ground 43, and the electrical output thereof is connected to the electrical input of another solenoid 71, the electrical output of which is connected to a positive direct current voltage 73. The remaining output of said solenoid 71 is connected to the actuation input of the aforesaid shade or shutter 21. Depending on the type of shade or shutter 21 which happens to be selected for any given operational purpose, said actuation output from solenoid 71 may either be mechanical, electrical, or electromechanical, as desired. In this particular case, however, it will be defined as being an exceedingly rapid acting mechanical actuator mechanism which timely closes and opens shutter or shade 21. Obviously, it would be well within the purview of one skilled in the art having the teachings presented herein to design the combination of solenoid 71 and shutter 21 in such manner that it would be operationally effective for any given operational circumstances.

In parallel with solenoid 71, a warning indicator is connected. Of course, said indicator may be any of many different types, including a warning light and/or bell.

As may readily be seen from FIG. 1, the aforementioned elements 61 through 75 constitute a safety system 77 which, as will be discussed more fully below, shuts off all radiant energy received by human eyes, camera, binoculars, telescopes, or other optical devices 33 whenever said radiant energy exceeds some preset value.

As previously suggested, direct current motor 51 is a reversible motor and, thus, it is connected through any predetermined conventional drive train 81 to the aforesaid rotatable polarizer 27 for effecting the drive thereof in whatever rotational direction is necessary for adjusting rotatable polarizer 27 with respect to fixed polarizer 23 to permit the proper control of the intensity of radiation 29. Obviously, drive train 81 may be of many conventional types that would be well known to the artisan; however, if desired, one similar to that shown in U.S. Pat. No. 2,423,321 to Hurley, Jr., may be used for such purpose.

A mechanical stop mechanism 83 is shown, in this particular case, as being connected to the output shaft of reversible motor 51, so as to effect the stopping of rotatable polarizer 27 at either one or both of its extremes of rotation. Of course, if so desired, said mechanical stop 83 could be physically disposed in such manner that it would mechanically stop, as desired, the rotation of said rotatable polarizer 27.

It would, in fact, be obvious to the artisan that all of the elements of automatic adjustable radiation energy system 11 must be mounted in such manners as will permit their intended use to be implemented. Furthermore, it would also appear to be obvious that the subject invention is preferably mounted on whatever apparatus that would be compatible with both the subject invention and the instrument with which it is combined. Nevertheless, as best seen in FIG. 2, an eminently satisfactory mounting apparatus that may be used as mounting apparatus 83 could be, say, head straps, a helmet, or the like, which is worn by a human being 87.

With respect to FIG. 2, it should be readily apparent that only a generalized partial disclosure is portrayed therein. However, it is believed that the structure shown therein is sufficient to disclose one particular exceedingly valuable use to which the subject invention may be put.

In addition, the illustration of FIG. 2 shows one embodiment of the type of mounting apparatus that may be used in conjunction with the invention, and in greater particularity, shows that the aforementioned filter 17 is or may be mounted for rotation on a shaft of a bolt 87 which is screwed into or otherwise conventionally connected to mounting apparatus 85 attached to a head strap cap, helmet, or the like, 89 worn on the head 91 of a human being.

Referring now to FIG. 4, the array of photodetectors 31 is shown as surrounding eyes 33 in a substantially oblong configuration, and the number of photodetectors included in the array thereof is such as will provide whatever protection from a radiant energy sensing standpoint as is warranted during operational circumstances.

FIG. 5 depicts another geometrical configuration which may be used for the mounting of photodetectors 31. In this particular case, two arrays thereof happen to be shown; nevertheless, any number thereof may be used as warranted by the apparatus being protected and operational circumstances. Hence, photodetector array 31 is shown surrounding a pair of eyes or other instrument optical inputs 33. Again, for purposes of emphasis, it would appear to be noteworthy that the number of geometrical designs of said photodetector arrays would be contingent upon the number of optical inputs contained by any given device or apparatus being protected.

At this time, it may be worthy of note that all of the elements disclosed in FIG. 1 and the other figures of the drawing are well known, commercially available, and conventional, per se; therefore, it is to be understood that it is their unique respective optical, electrical, and physical interconnections and interactions that effect the improved automatic adjustable radiant energy system constituting this invention and causes it to produce the improved results stated above.

Mode of Operation

The operation of the invention will now be discussed briefly in conjunction with all of the figures of the drawing.

At the outset, it would perhaps be noteworthy that, for the sake of keeping this discussion as simple as possible, it will be assumed that the intended use of the invention is to protect human eyes from dangerous laser light, although, as indicated above, it is responsive to other types of radiant energy and, it has many other uses, too.

Figure 3:
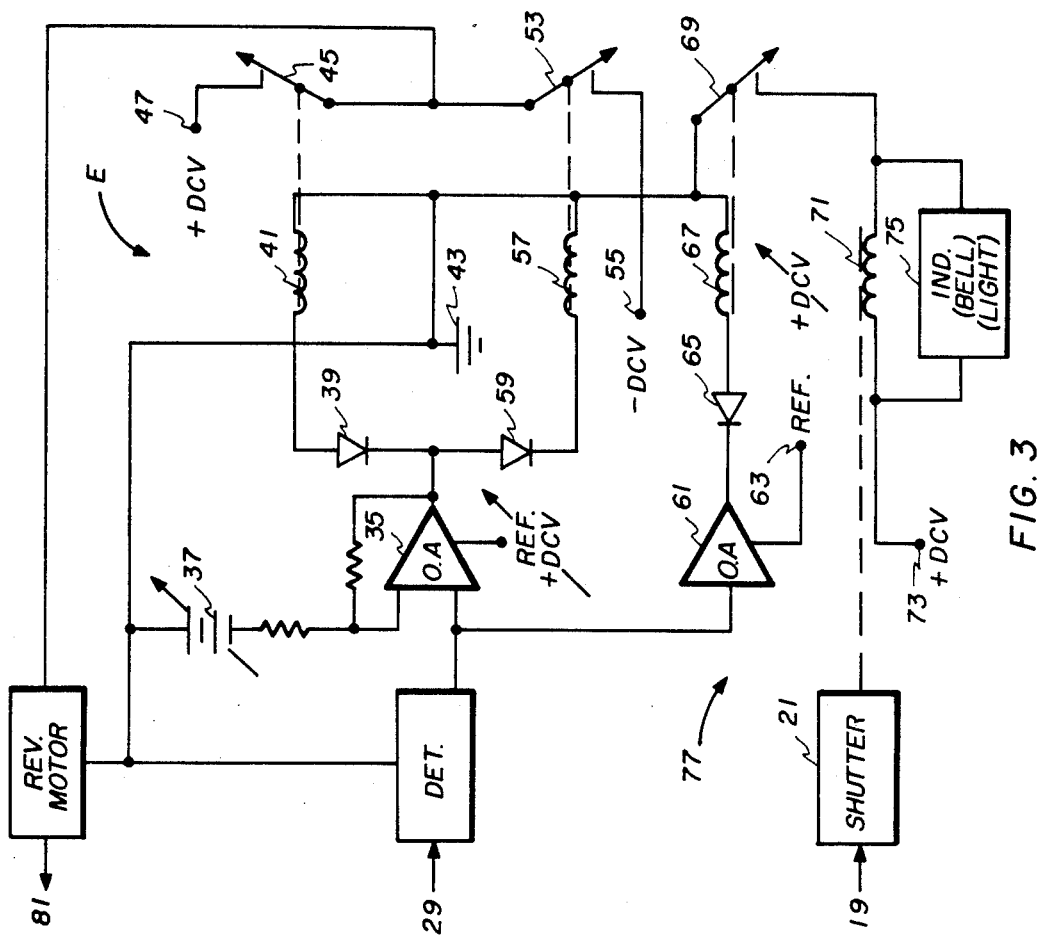
FIG. 3 is predominantly a schematic diagram of the automatic control and feedback system of FIG. 1.

Furthermore, where appropriate, the circuit analysis applied to FIGS. 1 and 3 will be in accordance with Navy modern electron theory, wherein the electrons — and, hence, electrical current — is considered to flow from relatively minus to plus voltages. Thus, for example, it will be presumed that current flows from ground to a positive direct current voltage, and from a voltage more negative than ground to ground.

Referring first to FIG. 1 in particular, laser light 13 is received by the optical entrance of the invention, previously defined as being movable filter 17, wherein it may be filtered to exclude some, most, or all of the ambient light wavelengths and, optionally, much of the laser light involved, too, so as to limit the intensity thereof to a less dangerous and, thus, more useful level. In any event, as a result of passing through filter 17, originally received laser light 13 becomes filtered laser light 19.

As filtered laser light 19 travels to and through fixed polarizer 23, it becomes polarized in one direction as polarized laser light 25, and it is that polarized laser light that travels to and through rotatable polarizer 27 to the extent permitted by the relative angular dispositions of both polarizers 23 and 27, as is conventional with variable polarized filters, to become that amount of laser light 29 to which photodetectors 31 and human eyes 33 are subjected. To elaborate further regarding the operation of the aforementioned polarizers 23 and 27 as they are arranged and used in the invention, it may perhaps be worthy of some note that the rotation of one thereof with respect to the other thereof from a state of relative parallel polarizations to a state of relative perpendicular polarizations increases the filtering action of any radiant energy passing therethrough. Of course, only that amount of laser light 29 that will not damage eyes 33 is permitted to be transmitted thereto; consequently, that safe amount is herewith defined as being the set point intensity or set maximum desired intensity. As a matter of fact, however, that set maximum desired laser light intensity may be exceeded very slightly (but not dangerously) because the control thereof actually hunts thereabout slightly, due to nature of negative feedback control system, in general, and the unique one incorporated in the invention, in particular. Nevertheless, because of the negative feedback system combined with the other sensor and optical elements of the invention, an exceedingly positive, efficient, and rapid-acting, reliable system results which causes said set laser light intensity point to be very accurately maintained with perhaps an absolute minimum hunting deviation therefrom, in view of the present state of the art. Of course, such almost perfect set point following is one of the important improvements that the instant invention provides that ostensively makes it somewhat better than all known prior art.

The aforementioned excellent laser light intensity control subsystem is actually quite simple; nevertheless, its simplicity does not detract from its usefulness nor from its significance from the newness, uniqueness, and usefulness standpoints. Accordingly, the circuit thereof will now be further analyzed in conjunction with FIGS. 1 and 3, wherein, as indicated above, like parts have like reference numerals, although additional ones may be respectively used therein, too.

Photodetectors 31 may be either connected in series or in parallel and are preferably mounted as an array which is physically disposed in as close proximity with eyes 33 (or any other object to be protected from excessive laser light) as possible and practical. For instance, they may be deployed as shown in either FIG. 4 or FIG. 5, or in the alternative, only one thereof may be deployed at some critical place in substantially contiguous disposition with one or both of eyes 33 of human being 87. The artisan, of course, could readily design the geometrical configuration and number of photodetectors in any given array thereof without violating the spirit or scope of the invention; hence, further details with respect thereto are deemed to be unnecessary at this time.

As previously suggested, when photodetectors 31 receive laser light 29, it is transduced thereby into an electrical signal that is proportional thereto, and that is the signal that constitutes the output signal therefrom which is supplied to the input of operational amplifier 35. Now amplifier 35 performs an exceedingly useful function, as far as the subject invention is concerned. Because it is designed to do so, the internal workings thereof are such that the output signal therefrom varies about a ground potential in inverse proportion with the variation of the input signal supplied thereto by photodetectors 31, and in this particular case it varies about ground 43. In addition, the output signal from operational amplifier 35 always varies in a positive or negative direction with respect to ground 43, regardless of the aforesaid desired set point laser light intensity. Furthermore, it has been designed (in a well known and conventional manner) to maintain any given relationship between its input and output voltages, the relationship of which may be adjusted by adjusting (manually or otherwise) a control voltage supplied to the control input thereof. Of course, it may now be seen that the set point amount of laser light 29 permitted to pass through fixed and rotatable polarizers 23 and 27 is also proportional to the control voltage supplied to operational amplifier 35, and the consequence of a fluctuation of said laser light 29 is a like fluctuation in the voltage signal from photodetectors 31 and a comparable or proportional fluctuation of the output voltage signal of operational amplifier 35 about ground 43. In this particular embodiment, the aforementioned inverse proportions are functionally effected internally and automatically in a very efficient and expeditious manner in operational amplifier 35, but they are, nevertheless, proportions. Hence, because of the need for such inverse proportions, operational amplifier 35 has probably been conventionally designed to include a logical inverter therein. In any event, even though suitable operational amplifiers are available commercially (as indicated previously), whatever one is included in this invention as operational amplifier 35 (and operational amplifier 61, as will be discussed more fully subsequently) constitutes a key component thereof which, insofar as it is known, makes the invention produce results heretofore unobtainable.

To supply the aforementioned control voltage to operational amplifier 35, reference positive direct current 37 is employed. And, again, for purposes of emphasizing the importance thereof, the amount of voltage supplied thereto determines the input set point level thereof.

From the foregoing, and from observing the circuits of FIGS. 1 and 3, it may be seen that the cathode input of diode 39 and the anode output of diode 59 are effectively connected to a potential that is equal to ground 43, except when there is a deviation of laser light 29 from is desired set point intensity level, since the output of operational amplifier 35 is connected to both thereof.

Let is now be assumed for the purpose of this explanation that, for some reason or another, the intensity of laser light 13 has increased and, therefore, laser light 29 to which eyes 33 are exposed has likewise increased above the desired preset level (but, of course, not to the same extent due to the filtering actions of filter 17 and polarizers 23 and 27). In such case, the output voltage signal from operational amplifier 35 decreases and becomes effectively negative with respect to ground 43. Because this voltage is now more negative than ground, it cannot cause current to pass through diode 59, due to the connection polarity thereof; but because it is now more negative than ground, it does cause current to flow from left to right through diode 39 and relay solenoid 41 to ground 43, energizing relay solenoid 41. The energization of solenoid 41 causes normally open relay switch 45 to be closed, and the closure thereof, in turn, causes electric current to flow from ground 43 to the more positive direct current voltage 47 through reversible direct current motor 51, thereby causing it to rotate polarizer 27 in that direction — say, clockwise, for the sake of explanation — relative to fixed polarizer 23, so that the amount of laser light 29 passing through both thereof is further filtered and, thus, reduced. But reduction of laser light 29, as previously explained, causes the output voltage from operational amplifier 35 to be increased until it reaches ground 43, at which time motor 51 stops, due to the fact that solenoid 41 becomes deenergized and permits relay switch 45 to return to its normally open position. At such time, equilibrium occurs in the feedback subsystem.

Unfortunately, because some time is required for the component parts of the invention to operate — even though only nanoseconds in duration — the aforesaid rotatable polarizer 27 is very, very slightly over driven and, in fact, stops ever so slightly past the aforementioned equilibrium state. Then, too little laser light is passing through polarizers 23 and 27, and the opposite effect takes place. In such case, the output voltage from operational amplifier 35 is slightly too high to permit current to pass through diode 39 and, obviously, due to its connected polarity, electric current cannot pass from left to right through diode 59. Nevertheless, the too high positive voltage at the output of operational amplifier 35 does cause current to flow, but this time, it flows from a lower ground potential 43 through relay solenoid 57 and from right to left through diode 59. The resulting energization of relay solenoid 57 causes normally open switch 53 to be closed, thereby, in turn, causing current to flow from negative direct current voltage 55 to a more positive ground 43 through reversible direct current motor 51, thereby causing it to rotate polarizer 27 in a direction — say, counterclockwise — that is opposite that mentioned before. The rotation of polarizer 27 in such manner relative to fixed polarizer 23 permits a little more laser light to pass therethrough, thus effecting a lowering of the voltage at the output of operational amplifier 35 until it again reaches equilibrium with ground 43, at which time polarizer 27 stops rotating.

Because each positive and negative voltage cycle of operation tends to very slightly overcorrect for laser light intensity deviations, laser light 29, in fact, hunts a very, very small amount — a negligible amount for most practical purposes — about the desired intensity level that was effectively preset by the analog voltage thereof represented by reference positive direct current voltage 37.

In order to prevent rotatable polarizer 27 from rotating too far in either the clockwise or counterclockwise direction, mechanical stop 83 is associated with reversible motor 51 for such purpose, as is conventional in the art. Of course, stop 83 could also be one which physically stops the rotation of polarizer 27, if so desired.

Due to the above mentioned, highly efficient operations that occur as a result of the new and unique combination of elements incorporated in this invention, human eyes 33 (and any other compatible optical device associated therewith) are protected for most practical purposes. Nevertheless, on occasion, the intensity of laser light 13 — and, hence, laser light 29 — may become so severely high without warning that it becomes necessary to prevent it from reaching eyes 33 entirely. In such case, an ultimate safety feature is warranted, and, accordingly, one has been included in the invention, herewith defined as being safety system 77.

The actuating portion of safety system 77 works very much like the laser light reducing portion of the aforementioned negative feedback control system, and, of course, as may readily be seen in FIGS. 1 and 3, it works in combination with shade or shutter 21, the latter of which is physically located somewhere in front of eyes 33. It, of course, also works in conjunction with the operation of the aforesaid feedback system and polarizers 23 and 27; however, once activated, it overrides them in toto, because shutter 23 becomes almost instantaneously closed.

Safety subsystem 77 includes an operational amplifier 61 which, in most instances, could be identical to the previously discussed operational amplifier 35. Accordingly, it, too, is operationally set to function as a result of its input being connected to the output of photodetectors 31. However, it is only intended to function whenever the intensity of laser light 29 becomes some predetermined unsafe level above the hunting level of the aforementioned negative feedback system. Consequently, a separate adjustable reference direct current voltage 63 is used to control it and, in fact, preset it at some threshold level. Hence, if desired, operational amplifier 61 and positive reference direct current voltage 63 could be considered as being a highly sensitive, exceedingly fast acting, very accurate thresholder which becomes activated at any time the output voltage of photodetectors 31 exceeds a preset level that is directly proportional to a predetermined level of laser radiation 13 that would, as previously suggested, be dangerous to human eyes 33.

Accordingly, whenever the input voltage to operational amplifier 35 exceeds a preset voltage, operational amplifier 61 becomes operative and a voltage that is some inverse proportion to said input voltage is produced at the output thereof, with said output voltage being less than ground 43. Therefore, current flows from left to right through diode 65 and relay solenoid 67 to ground 43, energizing said solenoid 67. The energization of solenoid 67 causes normally open relay switch 69 to be closed, thereby permitting current to flow from ground 43 therethrough, through solenoid 71, and indicator light and/or bell 75 to positive direct current voltage 73. Thus, indicator light and/or bell 75 is turned on, giving a sensatory warning to human being 87 that his eyes 33 are in jeopardy from excess laser light; but even more important, solenoid 71 actuates shade or shutter 21 to effect the almost instantaneous closure thereof, so as to immediately stop laser light 29 and, hence, prevent any laser light from reaching his eyes 33. Again, when proper laser light threshold limits are preset in the subject invention as a result of calibration and properly presetting reference positive direct current voltage 63, an adequate margin of safety is effected. Thus, eyes 33 are protected from excess laser radiation, even though it is recognized that some minute period of time — say, a few nanoseconds or so — is required for safety system 77 to function. Nevertheless, a considerable measure of eye protection is afforded thereby.

As previously suggested, any internal and external mounting means 85 may be employed to maintain and deploy the various components of the invention and the invention as a whole, respectively. Obviously, its intended use would determine where and on what object or instrument it is mounted. Therefore, only the head mounting thereof, as illustrated in FIG. 2, is portrayed as the preferred embodiment, inasmuch as it is truly representative, and since the artisan could, of course, readily extrapolate therefrom to effect other appropriate applications thereof.

Moreover, other modifications and variations of the present invention are possible in light of the above teachings. It is, therefore, to be understood that within the scope of the appended claims the invention may be practiced otherwise than as specifically described.

What is claimed is:

1. An automatic adjustable radiant energy filter system for controlling the intensity of a predetermined radiant energy passing therethrough, comprising in combination:

a normally open optical shutter means perpendicularly disposed with and on a predetermined optical axis adapted for receiving and selectively passing said predetermined radiant energy therethrough along said predetermined optical axis;

first optical polarizer means spatially located downstream from said normally open optical shutter in perpendicular disposition with and on said predetermined optical axis;

second optical polarizer means adapted for being relatively rotated with respect to said first optical polarizer means, with said second optical polarizer means located downstream from said first optical polarizer means in perpendicular disposition with and on said predetermined optical axis;

reversible motor means effectively connected to said rotatable second optical polarizer means for the driving thereof in either a clockwise or counterclockwise direction with respect to said first optical polarizer means;

photodetector means spatially disposed downstream from said second optical polarizer means;

negative feedback control means connected between the output of said photodetector means and the input of said reversible motor means for effecting the rotation of the aforesaid second optical polarizer means in such manner as to control the intensity of said predetermined radiant energy passing therethrough and through said first optical polarizer means at a first preset level; and means connected between the output of said photodetector means and the aforesaid normally open optical shutter means for effecting the closure thereof whenever the intensity of said predetermined radiant energy received by said photodetector means exceeds a second preset level that is a predetermined amount greater than the aforesaid first preset level.

2. The system of claim 1, wherein said predetermined radiant energy is a laser light.

3. The device of claim 1, wherein said photodetector means comprises a photodiode.

4. The device of claim 1, wherein said photodetector means comprises an array of parallel connected photodiodes.

5. The device of claim 1, wherein said photodetector means comprises an array of series connected photodiodes.

6. The device of claim 1, wherein said negative feedback control means connected between the output of said photodetector means and the input of said reversible motor means for effecting the rotation of the aforesaid second optical polarizer means in such manner as to control the intensity of said predetermined radiant energy passing therethrough and through said first optical polarizer means at a first preset level comprises:

- an operational amplifier having a data input, a control input, and an output with the data input thereof connected to the output of said photodetector means;
- an adjustable reference positive direct current voltage connected to the control input of said operational amplifier;
- a first diode having a cathode and an anode, with the cathode thereof connected to the output of said operational amplifier;
- a ground connected to one of the terminals of said reversible motor means;
- a first relay solenoid connected between the anode of said first diode and said ground;
- a first normally open relay switch connected to said first relay solenoid for the closure thereof upon energization of said first relay solenoid, with the input thereof connected to the other of the terminals of the aforesaid reversible motor means;
- a positive direct current voltage connected to the output of said first relay switch;
- a second diode having a cathode and an anode, with the anode thereof connected to the output of the aforesaid operational amplifier;
- a second relay solenoid connected between said ground and the cathode of said second diode;
- a second normally open relay switch connected to said second relay solenoid for closure thereof upon energization of said second relay solenoid, with the output thereof connected to said other terminal of the aforesaid reversible motor means; and
- a negative direct current voltage connected to the input of said second relay switch.

7. The invention of claim 1, further characterized by a drive train connected between the output of said reversible motor means and the drive input of said second optical polarizer means.

8. The invention of claim 1, further characterized by means connected to said reversible motor means for stopping the rotation thereof at both ends of a predetermined angular running range.

9. The invention of claim 1, further characterized by means spatially disposed upstream from said normally open optical shutter means and located on said predetermined optical axis in perpendicular disposition therewith for filtering out ambient radiant energy having predetermined frequencies.

10. The device of claim 9, wherein said radiant energy filtering means comprises a manually movable filter that may selectively be mounted on or off of said predetermined optical axis.

11. The device of claim 1, wherein said means connected between the output of said photodetector means and the aforesaid normally open optical shutter means for effecting the closure thereof whenever the intensity of said predetermined radiant energy received by said photodetector means exceeds a second preset level that is a predetermined amount greater than the aforesaid first preset level comprises:

- an operational amplifier having a data input, a control input, and an output, with the data input thereof connected to the output of said photodetector means;
- an adjustable reference positive direct current voltage connected to the control input of said operational amplifier;
- a diode having an anode and a cathode, with the cathode thereof connected to the output of said operational amplifier;
- a ground;
- a relay solenoid connected between the anode of said diode and said ground;
- a normally open relay switch connected to said relay solenoid for closure thereof upon energization of said relay solenoid, with the input of said relay switch connected to said ground;
- a positive direct current voltage; and
- a shutter actuating solenoid connected between the output of said relay switch and the input of said positive direct current voltage, with the actuator output thereof connected to the actuation input of the aforesaid normally open optical shutter means.

12. The invention of claim 11, further characterized by a warning indicator connected in parallel with said shutter actuator solenoid.

13. The device of claim 12, wherein said warning indicator is an electric light.

14. The device of claim 12, wherein said warning indicator is a bell.

15. An automatic adjustable radiant energy filter system for controlling the intensity of a predetermined radiant energy passing therethrough, comprising in combination:

- a normally open optical shutter means perpendicularly disposed with and on a predetermined optical axis adapted for receiving and selectively passing said predetermined radiant energy therethrough along said predetermined optical axis;
- first optical polarizer means spatially located downstream from said normally open optical shutter in perpendicular disposition with and on said predetermined optical axis;
- second optical polarizer means adapted for being relatively rotated with respect to said first optical polarizer means, with said second optical polarizer means located downstream from said first optical polarizer means in perpendicular disposition with and on said predetermined optical axis;
- reversible motor means effectively connected to said rotatable second optical polarizer means for the driving thereof in either a clockwise or counterclockwise direction with respect to said first optical polarizer means;
- photodetector means spatially disposed downstream from said second optical polarizer means;
- negative feedback control means connected between the output of said photodetector means and the input of said reversible motor means for effecting the rotation of the aforesaid second optical polarizer means in such manner as to control the intensity of said predetermined radiant energy passing therethrough and through said first optical polarizer means at a first preset level;

means connected between the output of said photodetector means and the aforesaid normally open optical shutter means for effecting the closure thereof whenever the intensity of said predetermined radiant energy received by said photodetector means exceeds a second preset level that is a predetermined amount greater than the aforesaid first preset level; and means contiguously disposed with and upstream from said normally open shutter means for selectively filtering the aforesaid predetermined radiant energy to be controlled and that ambient visible radiant energy effectively combined therewith in such manner that only a certain maximum intensity of said predetermined radiant energy to be controlled is passed therethrough while a certain minimum of said ambient visible radiant energy is passed therethrough.

16. The device of claim 15, wherein said means contiguously disposed with and upstream from said normally open shutter means for selectively filtering the aforesaid predetermined radiant energy to be controlled and that ambient visible radiant energy effectively combined therewith in such manner that only a certain maximum intensity of said predetermined radiant energy to be controlled is passed therethrough while a certain minimum of said ambient visible radiant energy is passed therethrough comprises an optical filter that is capable of being adjustably disposed in and out of contiguous upstream disposition with the aforesaid normally open optical shutter means; said predetermined radiant energy to be controlled is laser light having a particular wavelength; and said ambient visible radiant energy is light which falls into the visible spectrum of the human eye.

17. The device of claim 15, further comprising:
head-strap means adapted for being securely fitted on a human head, so as to be effectively worn thereby;
means connected between said head-strap means and the aforesaid automatic adjustable radiant energy filter system for effecting the mounting thereof thereon as a predetermined unitary combination thereof.

18. The device of claim 15, wherein said means connected between the output of said photodetector means and the aforesaid normally open optical shutter means for effecting the closure thereof whenever the intensity of said predetermined radiant energy received by said photodetector means exceeds a second preset level that is a predetermined amount greater than the aforesaid first preset level comprises:
an operational amplifier having a data input, a control input, and an output, with the data input thereof connected to the output of said photodetector means;
an adjustable reference positive direct current voltage connected to the control input of said operational amplifier;
a diode having an anode and a cathode, with the cathode thereof connected to the output of said operational amplifier;
a ground;
a relay solenoid connected between the anode of said diode and said ground;
a normally open relay switch connected to said relay solenoid for closure thereof upon energization of said relay solenoid, with the input of said relay switch connected to said ground;
a positive direct current voltage; and
a shutter actuating solenoid connected between the output of said relay switch and the input of said positive direct current voltage, with the actuator output thereof connected to the actuation input of the aforesaid normally open optical shutter means.

19. The device of claim 18, wherein said operational amplifier is an inverse logical operational amplifier, wherein the output signal therefrom is some predetermined inverse proportion of the input signal thereto and the inverse proportion therebetween is adjustable as desired.

20. The device of claim 15, wherein said negative feedback control means connected between the output of said photodetector means and the input of said reversible motor means for effecting the rotation of the aforesaid second optical polarizer means in such manner as to control the intensity of said predetermined radiant energy passing therethrough and through said first optical polarizer means at a first preset level comprises:
an operational amplifier having a data input, a control input, and an output with the data input thereof connected to the output of said photodetector means;
an adjustable reference positive direct current voltage connected to the control input of said operational amplifier;
a first diode having a cathode and an anode, with the cathode thereof connected to the output of said operational amplifier;
a ground connected to one of the terminals of said reversible motor means;
a first relay solenoid connected between the anode of said first diode and said ground;
a first normally open relay switch connected to said first relay solenoid for the closure thereof upon energization of said first relay solenoid, with the input thereof connected to the other of the terminals of the aforesaid reversible motor means;
a positive direct current voltage connected to the output of said first relay switch;
a second diode having a cathode and an anode, with the anode thereof connected to the output of the aforesaid operational amplifier;
a second relay solenoid connected between said ground and the cathode of said second diode;
a second normally open relay switch connected to said second relay solenoid for closure thereof upon energization of said second relay solenoid, with the output thereof connected to said other terminal of the aforesaid reversible motor means; and
a negative direct current voltage connected to the input of said second relay switch.

21. The invention of claim 20, wherein said operational amplifier is an inverse logical operational amplifier, wherein the output signal therefrom is some predetermined inverse proportion of the input signal thereto and the inverse proportion therebetween is adjustable as desired.

22. The invention of claim 20, further characterized by a safety warning indicator connected in parallel with said shutter actuator solenoid.

23. An automatic adjustable radiant energy system for controlling the intensity of a predetermined radiant energy transmitted therethrough and toward a predetermined optical sensor means, comprising in combination:

a normally open, rapid-acting optical shutter disposed on a predetermined optical axis;

a fixed polarizer contiguously disposed with and downstream from said optical shutter on said predetermined optical axis;

a rotatable polarizer contiguously disposed with and downstream from said fixed polarizer on said predetermined optical axis;

a plurality of photodetectors spatially disposed downstream from said rotatable polarizer;

a ground connected to one of the inputs of said plurality of photodetectors;

a first operational amplifier having a data input, a control input, and an output, with the data input thereof connected to the output of said plurality of photodetectors;

a first reference positive direct current voltage connected to the control input of said first operational amplifier;

a first diode having an input and an output, with the input thereof connected to the output of said first operational amplifier;

a first relay solenoid having an input and a pair of outputs, with the input thereof connected to the output of said first diode, and with one of the outputs thereof connected to the aforesaid ground;

a first normally open relay switch having a pair of inputs and an output, with one of the inputs thereof connected to the output of said relay solenoid for closure thereby upon energization thereof;

a positive direct current voltage connected to the output of said relay switch;

a reversible motor having a pair of electrical terminals and a shaft output, with one of the electrical terminals thereof connected to the input of said first relay switch, and with the other electrical terminal thereof connected to said ground;

a second diode having an input and an output, with the output thereof connected to the output of the aforesaid operational amplifier and the input of the aforesaid first diode;

a second relay solenoid having an input and a pair of outputs, with the input thereof connected to the aforesaid ground, and with one of the outputs thereof connected to the input of the aforesaid second diode;

a second normally open relay switch having a pair of inputs and an output, with one of the inputs thereof connected to the remaining output of said second relay solenoid for closure thereby upon energization thereof, and with the output thereof connected to the input of said first normally open relay switch and said one terminal of the aforesaid reversible motor;

a negative direct current voltage connected to the remaining input of said second relay switch;

a second operational amplifier having a pair of inputs and an output, with one of the inputs thereof connected to the output of the aforesaid plurality of photodetectors;

a second reference positive direct current voltage connected to the other input of said second operational amplifier;

a third diode having an input and an output, with the input thereof connected to the output of said second operational amplifier;

a third relay solenoid having an input and a pair of outputs, with the input thereof connected to the output of said third diode, and with one of the outputs thereof connected to the aforesaid ground;

a third normally open relay switch having a pair of inputs and an output, with one of the inputs thereof connected to said ground, and with the other of the inputs thereof connected to the remaining output of said third relay solenoid for closure thereby upon energization thereof;

another positive direct current voltage;

a fourth solenoid having an input and a pair of outputs, with the input thereof connected to the output of said third relay switch, with one of the outputs thereof connected to the input of said another positive direct current voltage, and with the remaining output thereof connected to the actuation input of the aforesaid shutter, so as to effect the closure thereof upon energization of said fourth solenoid;

a warning indicator connected in parallel with said fourth solenoid; and a predetermined drive train connected between the shaft output of said reversible motor and a drive input of the aforesaid rotatable polarizer.

24. The invention of claim 23, further characterized by means effectively connected to said reversible motor for permitting the running thereof only within predetermined angular limits.

25. The invention of claim 23, further characterized by a movable filter contiguously disposed with and upstream from the aforesaid shutter, said filter being manually movable in and out of a predetermined position upstream from said shutter and, in addition, having such characteristics as will obviate the passing of predetermined radiation intensities and frequencies, while permitting the passage therethrough of other predetermined radiation intensities and frequencies.

26. The invention of claim 23, further characterized by:

helmet means adapted for being worn on the head of a human being; and means for mounting the aforesaid automatic adjustable radiant energy filter system on said helmet means in such manner as to deploy the downstream side of the aforesaid rotatable polarizer in predetermined alignment with the aforesaid predetermined optical sensor means.

27. The invention of claim 23, further characterized by means effectively connected to said automatic adjustable radiant energy filter system for the mounting thereof on the aforesaid predetermined optical sensor means.

28. The device of claim 27, wherein said optical sensor means is a pair of human eyes.

29. The device of claim 27, wherein said optical sensor means comprises a camera.

30. The device of claim 27, wherein said optical sensor means comprises a pair of binoculars.

31. The device of claim 27, wherein said optical sensor means comprises a telescope.

* * * * *